United States Patent
McCullough

(10) Patent No.: US 8,267,149 B2
(45) Date of Patent: Sep. 18, 2012

(54) SCREW DESIGN AND METHOD FOR METAL INJECTION MOLDING

(75) Inventor: Kevin A McCullough, North Kingstown, RI (US)

(73) Assignee: Cool Options, Inc., North Kingstown, RI (US)

( * ) Notice: Subject to any disclaimer, the term of this patent is extended or adjusted under 35 U.S.C. 154(b) by 8 days.

(21) Appl. No.: 12/835,834

(22) Filed: Jul. 14, 2010

(65) Prior Publication Data

US 2010/0276104 A1    Nov. 4, 2010

Related U.S. Application Data

(62) Division of application No. 12/044,490, filed on Mar. 7, 2008.

(60) Provisional application No. 60/894,202, filed on Mar. 10, 2007.

(51) Int. Cl.
*B22D 17/00* (2006.01)

(52) U.S. Cl. .......... 164/113; 164/303; 164/312; 366/78; 366/79; 366/90; 425/208; 425/587

(58) Field of Classification Search .................. 425/208, 425/587; 366/78, 79, 90; 164/113, 303, 164/312
See application file for complete search history.

(56) References Cited

U.S. PATENT DOCUMENTS

| | | | |
|---|---|---|---|
| 3,486,193 A * | 12/1969 | Christensen et al. ......... | 425/203 |
| 3,653,951 A * | 4/1972 | Maldeis et al. .............. | 427/140 |
| 3,665,068 A | 5/1972 | Duling et al. | |
| 3,676,034 A | 7/1972 | Wendricks | |
| 3,945,786 A * | 3/1976 | Bishop ......................... | 425/208 |
| 4,128,341 A | 12/1978 | Hsu | |
| 4,155,690 A * | 5/1979 | Checkland et al. .......... | 425/113 |
| 4,958,933 A * | 9/1990 | Zakich .......................... | 366/81 |
| 4,994,223 A | 2/1991 | Hestehave et al. | |
| 5,040,589 A * | 8/1991 | Bradley et al. ............... | 164/113 |
| 5,055,022 A | 10/1991 | Hirschberger | |
| 5,234,324 A * | 8/1993 | Kawabata .................... | 425/4 C |
| 5,685,357 A | 11/1997 | Kato et al. | |
| 6,051,267 A | 4/2000 | Jury et al. | |
| 6,062,717 A | 5/2000 | Schirmer et al. | |
| 6,554,454 B1 | 4/2003 | Kitano | |
| 6,679,312 B2 | 1/2004 | Hayashi et al. | |
| 7,172,333 B2 | 2/2007 | Anderson et al. | |
| 2002/0170696 A1 * | 11/2002 | Akers et al. .................. | 164/113 |
| 2006/0146642 A1 | 7/2006 | Peters et al. | |
| 2006/0196626 A1 | 9/2006 | Decker et al. | |

FOREIGN PATENT DOCUMENTS

| | | |
|---|---|---|
| EP | 0093449 A1 | 5/1983 |
| JP | 56027338 A | 3/1981 |
| JP | 5138716 A | 11/1991 |

* cited by examiner

*Primary Examiner* — David Sorkin
(74) *Attorney, Agent, or Firm* — Barlow, Josephs & Holmes, Ltd.

(57) ABSTRACT

A method of processing metal, metallic alloys, and metal matrix composites in a plastics injection molding machine is disclosed. The method includes the steps of providing a plastics injection molding machine having a screw. A step of removing the screw is included in the method. A step of replacing the screw with a modified screw configured and arranged for processing metals is also included. Alternatively, a step of removing the flights from the middle portion of the original screw shaft may be included.

4 Claims, 3 Drawing Sheets

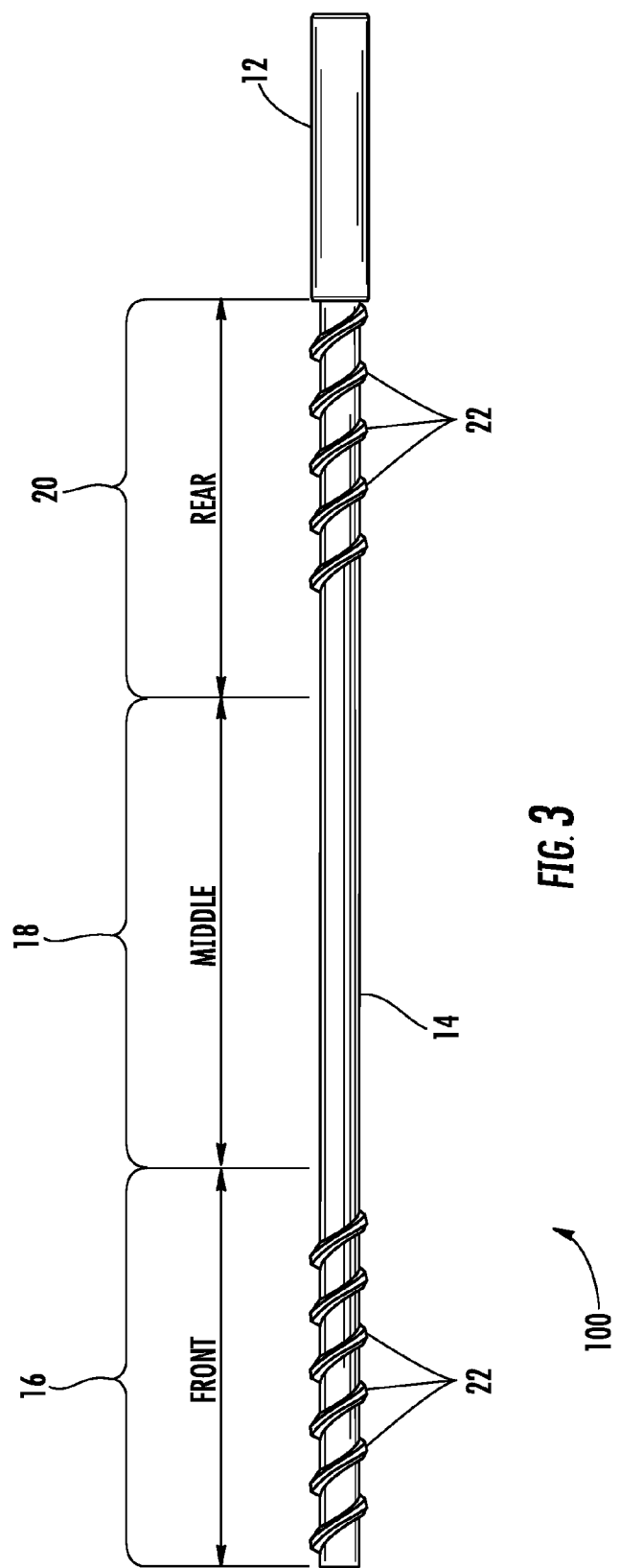

SCREW DESIGN AND METHOD FOR METAL INJECTION MOLDING

CROSS-REFERENCE TO RELATED APPLICATION

The present patent document is a division of U.S. patent application Ser. No. 12/044,490, filed on Mar. 7, 2008, which claims priority to earlier filed U.S. Provisional Patent Application Ser. No. 60/894,202, Filed Mar. 10, 2007; the entire contents of which are incorporated by reference herein.

BACKGROUND OF THE INVENTION

1. Field of the Invention

The present invention relates generally to injection molding and more specifically to a screw design for an injection molding machine configured for use with processing metals and method of configuring an injection molding machine for use with processing metals.

2. Background of the Related Art

Processing metals into 3-dimensional net shapes via conventional reciprocating screw injection molding equipment used for plastics has been a long time goal of many research efforts. Injection molding is a low cost processing technique to produce complex parts but has been limited to the molding of plastics for a variety of reasons.

There is an extremely large installed based of injection molding equipment worldwide. It is difficult to define the exact number but it is likely that there are more than 1 million injection molding machines in commercial use today. As an example, deliveries of injection molding machines in China alone have averaged around 50,000 units/year for the last few years. Injection molding equipment has a finite lifetime but it is a minimum of 10 years and many machines operate for 20 years or greater especially if they are properly maintained and/or upgraded (e.g. electronics).

Metals are generally accepted as not processable in conventional injection molding equipment intended for plastic processing. There are two main reasons. First, metal and their alloys of commercial interest generally (there are exceptions) have melting temperatures that are significantly above the maximum temperature capability of the majority of injection molding machines (typically 400° C./~800° F.). This temperature is sufficient for all or almost all organic polymers since they all tend to start to degrade (e.g. oxidize, carbonize, decompose) at temperatures above 400° C. (~800° F.).

The second issue is pressure. Although molten metals above their liquidus temperature have a very low viscosity, they crystallize so rapidly that it is difficult to overcome the strength of crystal formation in injection molding equipment. On the other hand, polymers (amorphous polymers and semi-crystalline polymers to a lesser extent) are viscous materials with a broad viscosity versus temperature relationship. Therefore, flow can be controlled by a combination of temperature and pressure. Unlike most metals, viscosity in polymers never drops to an extremely low value (e.g. water-like) such that it would be difficult to control The requirement for a material to have a finite force below which it will not move is an important characteristic for processing utility in conventional injection molding equipment. Polymers generally meet these criteria. Metals, in general, have a much sharper transition at their melting point. There are exceptions including semi-solid metals (semi molten metals at a temperature intermediate to their liquidus and solidus temperatures) and amorphous metal alloys that have a composition that retards or delays crystal formation.

As a result, the generally excepted method for producing 3-dimensional net shape parts from metals is die casting. In die casting the process temperature is well above the liquidus temperature and the molten metal is poured by gravity or pressure assisted to fill a cavity. Die casting and pressure assisted die casting are accepted processing methods and there are a large number of die casting facilities and equipment worldwide. There are some disadvantages to die casting based primarily on the uncontrolled flow of the material while filling the cavity. The lack of rheological control on the flow (water like viscosity) cause mold filling that is inconsistent, often causes voids or defects, creates undesirable surface finish effects, and less than desirable dimensional control (shrinkage). Another approach is to work with the metal in the semi-solid state (between its liquidus and solidus temperatures) to effectively lower the process temperature. Cooling of the semi-solid also produces lower shrinkage because of a portion of the "melt" is already solidified. This approach is used in the molding of certain magnesium alloys using a modified injection molding process referred to as thixomolding. One of the drawbacks of either of these processes is the availability of commercial equipment. Die casting usually involves a foundry-like environment to reach the process temperatures required. Thixomolding requires somewhat lower temperatures but uses force and therefore, very robust and specialized equipment, to overcome the rapid solidification or crystal growth. Thixomolded parts also in general have significant secondary requirements, surface finish repair, flash removal. There are also significant requirements on the handling and reprocessing of scrap, runners, etc.

A third route to near net shape metallic parts is often referred to as metal injection molding (MIM) or powder injection molding (PIM). In this case a perform or green part is injection molded at conventional temperatures using powdered metals and an organic or polymeric binder. The binder is removed and the part is sintered at high temperature in a reducing environment to generate the part. A large volume reduction (shrinkage) is associated with the sintering step. A fourth route is machining of the part from larger shapes or ingots to generate the desired dimensions. Additional methods (e.g. forging) can create some 3-dimensional shape but are not suitable for complex structures.

The four processes described are all used commercially and successfully. Yet, they all have significant cost or other drawbacks that limit wider utility and commercial significance. It would be certainly desirable if metal alloys were processable into 3-dimensional net shape parts using conventional injection molding equipment.

Therefore, there is a need within the industry for a method of processing metals in injection molding equipment.

SUMMARY OF THE INVENTION

The modified screw for an injection molding machine solves the problems of the prior art by providing screw shaft that can be used to process metals in an injection molding machine. The screw has a shank with a screw shaft extending therefrom. The screw shaft includes a front, middle and rear portions. The screw shaft also includes a number of flights used to advance material through the injection molding machine. In the preferred embodiment, flights on the screw shaft extend only through the rear section of the screw shaft. In an alternative embodiment, flights may also be included on the front portion of the screw shaft.

In lieu of manufacturing a new screw, the modified screw of the present may be made from a conventional plastics injection molding screw by selectively removing the flights in the middle and/or front portions of the screw shaft.

The screw may be used in conventional injection molding machines, traditionally used to process plastics, in order to process metals.

BRIEF DESCRIPTION OF THE DRAWINGS

These and other features, aspects, and advantages of the present invention will become better understood with reference to the following description, appended claims, and accompanying drawings where:

FIG. 3 is a plan view of an alternative embodiment of the screw design of the present invention.

DETAILED DESCRIPTION OF THE PREFERRED EMBODIMENT

Figure 1:
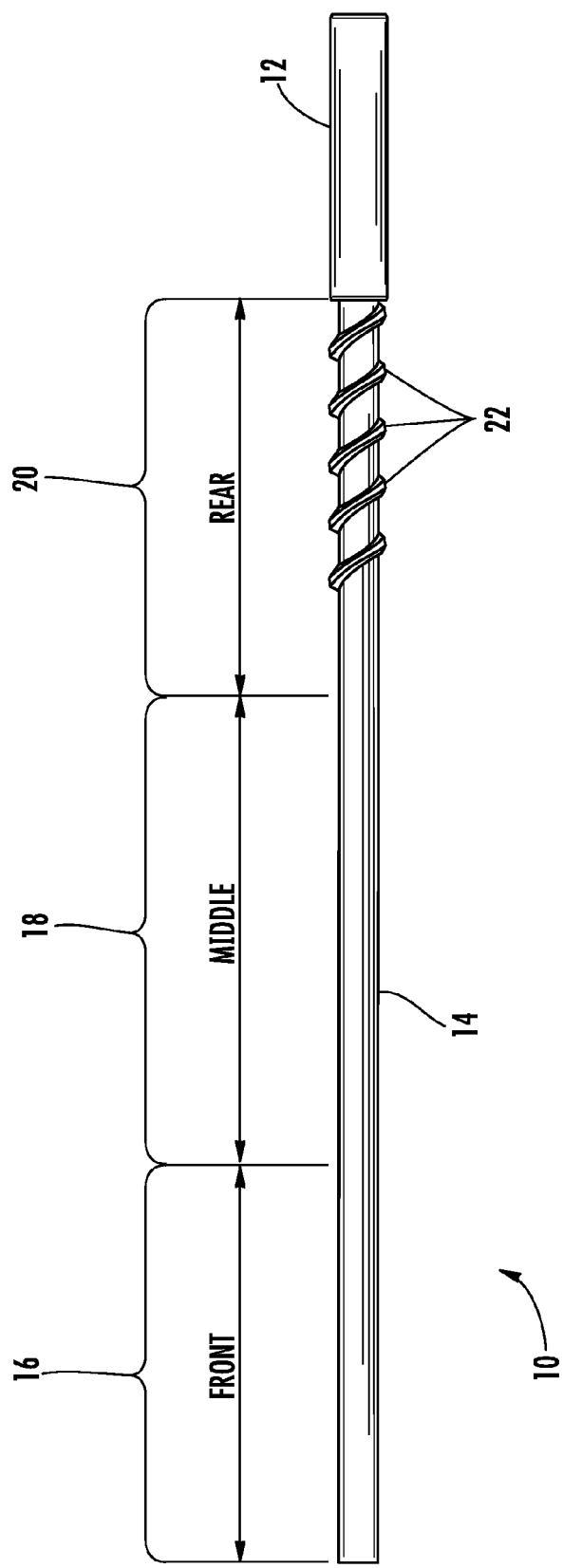
FIG. 1 is plan view of the preferred embodiment of the screw design of the present invention.

Referring now to FIG. 1, screw for an injection molding machine of the present invention is disclosed generally at 10. The screw has a shank 12 with a screw shaft 14 extending therefrom. The screw shaft 14 includes a front 16, middle 18 and rear 20 portions. The screw shaft 14 also includes a number of flights 22 used to advance material through the injection molding machine. In the preferred embodiment, flights 22 on the screw shaft 14 extend only through the rear section 20 of the screw shaft 14. In an alternative embodiment 100, best seen in FIG. 3, flights 22 may also be included on the front portion 16 of the screw shaft 14. However, it is imperative that the flights 22 be eliminated (or not included) in the middle portion 18 of the screw shaft 14.

Figure 2:
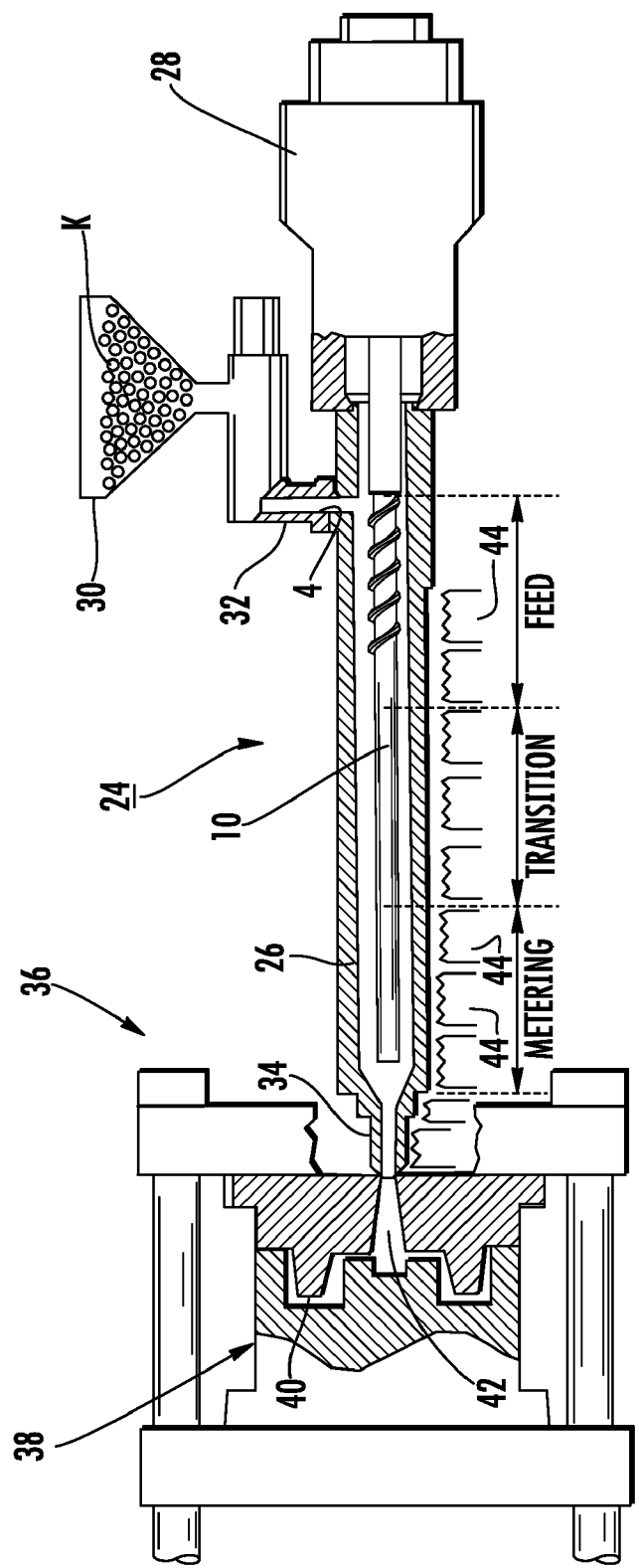
FIG. 2 is a partial cross-section view of a conventional plastic injection molding machine incorporating the preferred embodiment of the screw design of the present invention.

Referring now to FIG. 2, a plastics injection molding machine configured with the screw 10 of the present invention is shown generally at 24. The injection molding machine 24 includes a barrel section 26 that is roughly divided into three zones, feed, transition and metering, which will be further described below. The screw 10 is rotated and plunged in the barrel by a motor 28. Material K is fed into the feed zone of the barrel 26 through a hopper 30 and a feed throat 32. At the metering zone of the barrel 26, is a nozzle 34 that is connected to a mold press 36 having a mold 38 with a mold cavity 40 and sprue 42. The sprue 42 and mold cavity 40 are in fluid connected with the nozzle 34. Temperature in the barrel 26 is partially controlled through heaters 44.

The screw 10 of present invention allows a wide range of metals and their alloys and composites to be processed into 3-dimensional net shape parts using the conventional injection molding equipment intended for the processing of plastics. Although conventional injection molding equipment would not be expected to be able to process all metals and their alloys based on a temperature limit (e.g. high temperature steels, etc.) there is a range of commercially interesting alloys and their composites that would be anticipated to find much broader utility if they could be processed using the installed worldwide base of injection molding machinery.

Three main issues (i.e. temperature capacity, mechanical capacity, viscosity characteristics) have been the significant limitations for processing metals, metal alloys, and their composites in conventional molding equipment. They are 1) viscosity control, 2) machine temperature and 3) machine mechanics.

Viscosity considerations are based on the characteristic that most metals and alloys have very low viscosities above their solidus temperature and particularly above their liquidus temperature. It is difficult to control the flow of a very low viscosity fluid in the injection molding process both through the injection process and in the filling of the mold cavity. Creation of a high viscosity melt with plastic flow as a function of temperature addressed in the previous disclosures.

The second issue is temperature since many useful metals and their alloys have melt temperatures above the standard range of conventional injection molding equipment. The typical range is 100-400° C. (~200-800° F.) because this range accommodates almost all organic polymers and in general, temperatures above 400° C. (~800° F.) tend to degrade any organic compound including polymers. The typical range available in commercial injection molding equipment is not higher than this value simply do to the lack of need and the additional expense that would be required to go higher. Nonetheless, there are reasonably simple modifications that would allow most of the standard injection molding equipment to operate at substantially higher temperatures (up to 675° C./~1250° F. for example). Input heat has to be increased and this is simply accomplished by using heater bands that have higher temperature and higher rated power output. Machine construction is usually specific steel grades that have quite high temperature capability (usually well exceeding the range that is interesting in this disclosure i.e. up to 675° C./~1250° F. or about the melting point of pure aluminum). Other machine considerations, for example, seals and auxiliary components that are exposed to higher temperatures than normal due to the high melt process temperatures also have to be considered, replaced more frequently, or substituted with higher temperature materials of construction. Nonetheless, there are little or few obstructions to running the conventional injection molding equipment at substantially higher temperatures.

The third and most important consideration is the mechanical capacity of the conventional injection molding equipment. Historical attempts to process metals, their alloys and their composites in conventional injection molding equipment have not been successful. It has resulted in significant unacceptable events including cracked barrels, bent screws, motor damage, and/or leakage/spray of hot molten metal. These events are largely due to the inability of the machine to overcome the strength of solid metal (or solidifying metal, i.e. crystal formation). The machine motor and/or materials of construction typically do not have sufficient capacity to overcome metal strength, stiffness and hardness properties and therefore they fail first (e.g. cracked barrel).

A good example of trying to overcome these phenomena is what occurs in what is called the thixomolding process for magnesium alloys. In this specialized equipment the machine is highly oversized compared to conventional injection molding equipment of similar tonnage (i.e. clamping force). A thixomolding machine may appear to be 50% larger than the size of a conventional injection molding machine with similar clamping force simply due in part to the additional torque and strength of machine design required to process the magnesium alloy. The thixomolding machine is designed to mechanically break up/break down the crystallites/crystals (dendritic) that are formed in the magnesium alloys (and in most metals) as they cool or as they are held at temperature between their liquidus and solidus temperatures. Mechanically breaking up/down the crystals so that they can flow in a semi-solid medium is a design goal of the thixomolding process or machinery. For this reason and others (e.g. flammability of hot magnesium) specialized and more expensive equipment is required. The thixomolding process also attempts rapid injection (before material freezes off) and often uses vacuum tooling to reduce the effects of entrapped air in the tool cavity (i.e. cooling effect and time required to vent air).

A different approach and the approach in the subject invention is to avoid having the injection molding equipment 24 exert high forces (i.e. high pressures) on the partially solidified, partially solidified or crystalline material K.

The problem (high machine loads on strong, non-compressible metal that overcomes the strength limit of the machine and/or its components) is caused by the reciprocating nature of the standard conventional injection molding equipment 24. Almost all the injection molding equipment 24 manufactured currently for the processing of plastics is the reciprocating screw design. Older machines 24 often were a plunger design where material was fed by a screw to a zone in front of a plunger. The reciprocating screw design overcame a number of disadvantages of the plunger design including non-uniformity of temperature in the melt and very long residence time at temperature. These characteristics are particularly negative for plastics as the non-uniform temperature creates variations in the flow and the part integrity and the long periods at elevated temperature contribute to the degradation of the polymer/plastic.

There is a temperature profile along the screw (along the barrel 26) in the reciprocating screw injection molding machine 24. The length of the screw/barrel 26 can generally be segregating into three sections based on their function. These are the feeding, transition and metering sections.

The feeding section (typically about 50% of the length) is meant to transport solid pellets material K to the transition section, heat them to a temperature below melting/fusing, and compress them to a more densely packed structure (i.e. exclude the air and space between pellets). The transition zone is intended to melt the pellets/material K through mechanical shear and conductive heating from the barrel 26 wall as well as further exclude air and densify the melt to its theoretical value. The metering section attempts to provide a uniform temperature to the melt and deliver a precise volume of material in front of the screw tip for injection into the mold cavity.

Typically screw design is somewhat different in each section to help accomplish the function of each section.

The screw 10 of the present invention describes an injection molding screw design advantageous for the processing of metals, metallic alloys, and metal matrix composites on conventional reciprocating screw injection molding equipment.

Preferably the screw 10 flights 22 that have a 1:1 compression ratio or conceivably less than a 1:1 compression ratio. Typical recommended compression ratio (feed flight depth/metering flight depth) for most polymers and reinforced polymers/plastics is 2:1 to 3:1. The compression ratio is typically a ratio of linear depth but can also, and in a sense more accurately, be represented as a ratio of volumes (effective volume ratio between flights in the metering and feeding sections. The main purpose of compression along the screw 10 is to generate the mechanical forces (shear) that help melt and blend and mix the polymer pellets. In plastic injection molding, shear energy accounts for approximately half of the heat input to the polymer (the other half is through conduction from the heated barrel). Because polymers are typically poor conductors of thermal energy (e.g. thermal conductivity approximately 0.2 W/mK) conductive heating from the barrel is reasonably inefficient. The screw 10 constantly brings fresh material K to the wall of the barrel 26 to heat it and subsequent wipes it to combine it with the rest of the cooler material K yet the inherent low thermal conductivity still limits the efficiency of barrel 26 heating. Conversely, with metals, metallic alloys and metal matrix composites the thermal conductivity of the solid and the thermal conductivity of the melt are substantial. The thermal conductivity of a typical metal alloy is at least 250 times the thermal conductivity of the typical polymer. Therefore, the efficiency of the conductive heating from the barrel 26 is much more efficient given the transient nature (limited residence time) of the material K along the screw 10. The improved efficiency of conductive heating dramatically reduces the required shear heating to produce a homogenous and uniform temperature melt (i.e. a melt without incomplete melting of pellets K and without non-uniform viscosity or flow characteristics). Therefore, the need for compression to produce mechanical action and the resultant shear heating is not required. Without this requirement a screw 10 with at 1:1 compression ratio or potentially a compression ratio less than 1 is satisfactory and desirable and necessary.

The standard screw compression ratio 2:1 to 3:1 has a negative impact when attempting to process metals, alloys or their composites on conventional injection molding equipment. Metals in their solid and melt form are highly incompressible, strong, stiff and hard. The strength of the solidified or partially solidified metal is also very high. Therefore, machine 24 forces that attempt to compress or move (by action of the screw 10 turning) material that has a high strength, stiffness, hardness or is high incompressible can result in failure of the machine 24 or its components (e.g. motor 28, barrel 26, etc).

An additional reason to use screw compression with a polymer is to meld the partially molten or molten pellets together to create a homogenous and uniform material. The viscosity of most plastics, even in the melt, is significant and sufficiently high to create difficulty in homogenization without additional mechanical action. This viscosity is very useful in injection molding. It allows pressure or force dependent transport as a function of temperature. The significant viscosity even at or above the melt temperature also allows the molten polymer to resist flow without an active force above some finite pressure (e.g. it won't run out of the nozzle 34 without pressure being applied). The finite viscosity of the polymer melt is also advantageous in proper filling of a mold cavity 40. Controlled flow (e.g. fountain flow, laminar flow) is desired to achieve optimal mechanical and physical properties in a molded part and the significant viscosity allows this. The transition from laminar to turbulent flow (undesired) is a function of fluid viscosity. At the same time the significant viscosity can create some negative factors. For example, in parts with a weld line the strength of the weld line is often impacted by the viscosity of the melt flow fronts, which determine the ability of the polymer to mix homogeneously at the weld line without the aid of additional mechanical action (e.g. shear). The melding and homogenization of amorphous polymers is often the most difficult because their viscosity is a function of temperature over a large temperature range and their melt viscosity even at high temperature is typically much higher than that of semi-crystalline polymers. The melding and homogenization of semi-crystalline polymers is aided by the non-linear viscosity transition above and below the crystalline melt temperature. However, rapid solidification and viscosity increase below the crystalline melt temperature can cause weld line strength problems and mold filling issues even more difficult. In these cases the material may want to freeze off (solidify) prior to homogenization (weld line) or mold cavity 40 filling.

The molten or partially molten metal, metal alloy or metal matrix composite typically contains material with significantly lower viscosity than the molten amorphous or semi-crystalline thermoplastic polymer. The low viscosity of a molten metal or the low viscosity phase in a semi-solid metal or viscous metal tends to have a high affinity for itself and metallic surfaces. The low viscosity and high affinity tends to displace air and create a more homogenous material than would be common in a polymer melt. These characteristics further reduce the need for compressive based shear heating and mixing.

There are significant disadvantages to screw based compression in the processing of metals on conventional injection molding equipment 24 and most of the requirements for screw based compression of polymers are not required by metals, Another significant complication in the processing for metals, metal alloys and their composites on conventional injection molding equipment 24 is the typically sharper viscosity transition or melt to solid transition than is seen in most thermoplastic polymers (amorphous and semi-crystalline). In additional to a sharper solid/melt transition the significantly increased thermal conductivity compared to polymers results in a much more rapid change in viscosity or solidification upon exposure to a heat transfer driving force (a change in external temperature). Additionally, the heat capacity of metals is typically lower than that of polymers so the changes in heat input have a greater impact on the temperature of the melt. Therefore, due to the much higher conductivity (typically 250× or greater) and the lower heat capacity (typically 2-4×) the effect of a differential temperature (driving force for heat transfer) has a much more pronounced effect on a metal than on a polymer.

The concept of the impact of differential temperature on the viscosity change (or solidification) of a metal is crucial in processing metals, metallic alloys and their composites on conventional injection molding equipment 24. Ignoring the density differences between plastics and metals the combined thermal conductivity and heat capacity difference implies that a change in temperature (e.g. in the barrel surface) can have a 1000× greater or faster impact on the temperature change or solidification in a metal versus a polymer. The implication for conventional injection molding equipment 24 is significant since the reciprocating screw causes a portion of the melt or melt/solid (pellet) mixture to travel between areas having significantly different external Barrel 26 temperature control in a conventional injection molding machine 24 is typically divided into three zones: metering, transition and feed (or front, middle and rear, respectively). Additionally there is typically nozzle 34 temperature control and feed throat 32 temperature control but these are not a concern in the current invention.

Temperature is not uniform throughout each zone (there is a gradient) but for explanation purposes and from a control standpoint it would be difficult to create a uniform temperature gradient along the screw 10. Even with a uniform temperature gradient the invented solution would still be required. For explanation purposes it is helpful to assume reasonably uniform barrel 26 temperature in each zone.

The typical temperature difference in each zone is significant. The temperature in the front is sufficiently high to keep the material in the melt at a viscosity significantly low to fill the mold cavity 40 completely without freezing off. The temperature in the feed zone is typically low enough to keep the pellets solid. The temperature in the transition zone is intermediate to the metering and feed zone and allows that material to start to melt and consolidate. For typical polymer processing there is a significant difference in zone temperatures. The difference is greater for high temperature polymers mainly because the melt temperature is significantly higher. Differences in temperature of 20-30° C. (~70-90° F.) between zones are not uncommon. The fluidity of polymers is less affected by this difference than the fluidity of metals is affected. Sometimes nozzle 34 temperature is slightly lower than metering zone temperature to keep the melt from oozing out of the nozzle 34.

In the processing of metals, metallic alloys and their composites difficulty occurs when the screw 10 rotates and attempts to move material K forward along the screw shaft 14 length. The difficulty occurs typically in the transition region where the material K is partially molten and partially solid. In the metering section where the material is molten the rotation of the screw 10 does not cause a problem. In the feed zone where the pellets remain solid there also is not a problem (there is sufficient free volume for the pellets to exclude each other). However, in the transition zone the screw 10 acts on a combination of melt and solid pellets. Since the solid metal pellets are strong and hard, they are forced to the barrel 26 wall and unless they melt instantaneously they can cause the screw 10 to bind or require high forces to move or break up. Additionally it is in this region where molten metal is most likely to experience rapid crystal formation (near the transition temperature of the metal) and produce a material that is very strong and difficult to move. When this happens that machine 24 appears to struggle in advancing the material K (noise, binding, high torque).

Elimination or reduction of the screw flights 22 in this region is critical to the successful processing of metals in injection molding equipment 24. Screw flights 22 in this area are not critical to advancement of the material K along the screw shaft 14/barrel 26 length. Elimination of the flights 22 in this region eliminates the machine 24 struggling to overcome the strength of the material by attempting to shear solidified or solidifying material near the barrel 26 wall. Material is advanced by flights 22 in the feed or rear section. Retraction of the screw 10 also returns some material K to cold sections of the barrel 26 where the material K may rapidly start to crystallize or solidify. Elimination or exclusion of the screw's 10 flights 22 in this region eliminates almost all the machine force on the solidifying or crystallizing material K that might cause extremely high local forces or pressures that could cause failure of the barrel 26 or other components.

The importance of the elimination of the middle (or transition) zone 18 screw flights 22 is demonstrated by the lower torque and elimination of noise when processing metals, metallic alloys and their composites in conventional injection molding equipment 24. The steady state operation of the injection molding equipment 24 at forces and pressures well within the design limits of the equipment 24 are critical for routine, continuous and acceptable operation in the processing of metals on conventional injection molding equipment 24.

Referring back now to FIG. 1, the preferred embodiment, all of the front (or metering and) middle (or transition) flights 22 as well as a portion of the rear (or feed) flights 22 have been removed.

FIG. 3 shows an alternative embodiment 100 with inclusion of front (or metering) flights 22 that are usually helpful in maintaining temperature control and shot size in polymer processing also work equally as well. Without removal of flights 22 in the correct areas routine and consistent processing of metals on conventional reciprocating screw injection molding equipment 24 is not acceptable from a production standpoint.

Accordingly, converting conventional plastics injection molding equipment 24 to process metals is accomplished by replacing a conventional plastics injection molding screw with the screw 10 of the present invention. Further, by controlling the temperature Therefore, it can be seen that the present invention provides a unique solution to the problem of processing metals in conventional injection molding equipment by providing a modified screw that lacks flights in the middle portion of the screw shaft. Flights may further be removed from the front portion of the screw as well.

It would be appreciated by those skilled in the art that various changes and modifications can be made to the illustrated embodiments without departing from the spirit of the present invention. All such modifications and changes are intended to be within the scope of the present invention except as limited by the appended claims.

What is claimed is:

1. A method of processing metal, metallic alloys, and metal matrix composites in a conventional plastics injection molding machine, comprising the steps of providing a conventional plastics injection molding machine having a conventional screw configured and arranged for processing plastics;

removing the conventional screw;

replacing the conventional screw with a modified screw configured and arranged for processing metals, the modified screw further comprising, a shank, a screw shaft extending from the shank, the screw shaft having a rear portion proximate to the shank, a middle portion proximate the rear portion, a front portion proximate the middle portion, and flights extending from the rear portion of the screw shaft for advancing material through the conventional plastic injections molding machine into the middle portion of the screw shaft;

removing all the flights from the middle portion of the screw shaft; and processing metal, metallic alloys, and metal matrix composites in the conventional plastics injection molding machine with the modified screw.

2. The method of claim 1, further comprising the step of removing all the flights extending from the front portion of the screw shaft.

3. The method of claim 1, wherein said flights have a 1:1 compression ratio.

4. The method of claim 1, wherein said flights have less than a 1:1 compression ratio.

* * * * *